Dec. 29, 1964 J. S. KAWABATA 3,163,037
DYNAMIC TORQUE METER
Filed Oct. 25, 1961 4 Sheets-Sheet 1
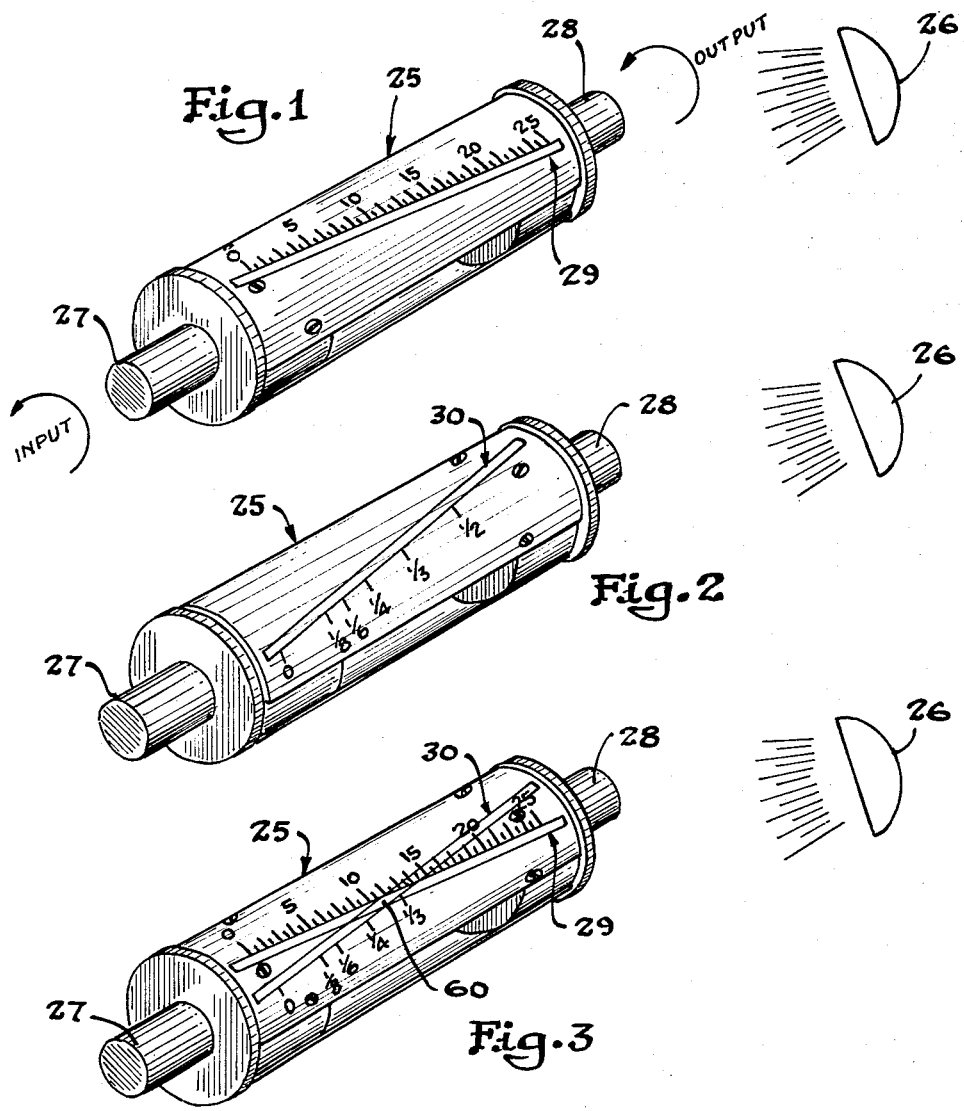
Inventor
James S. Kawabata
By Mann, Brown & McWilliams
Attorneys

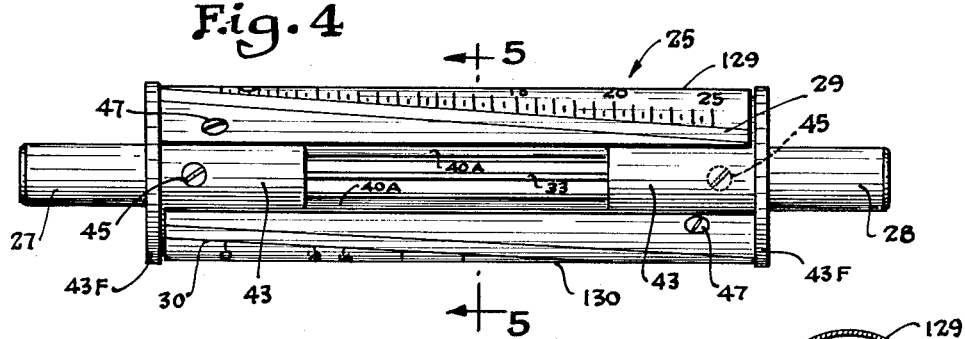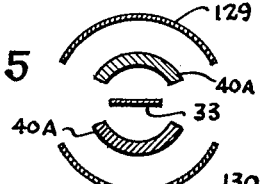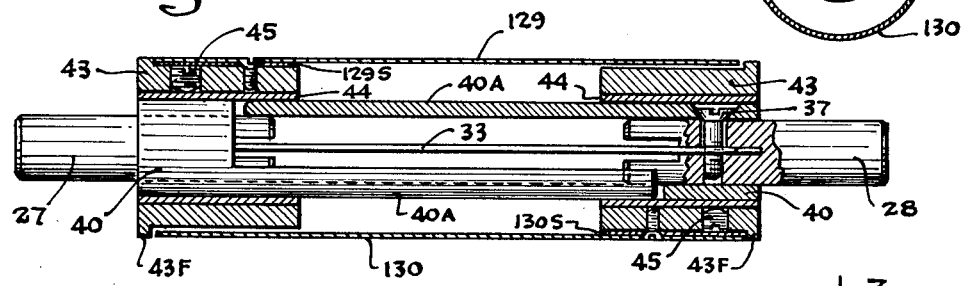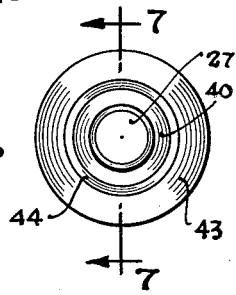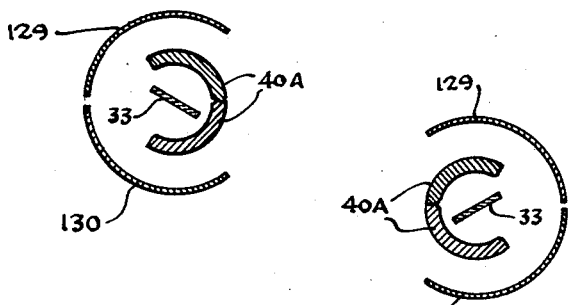

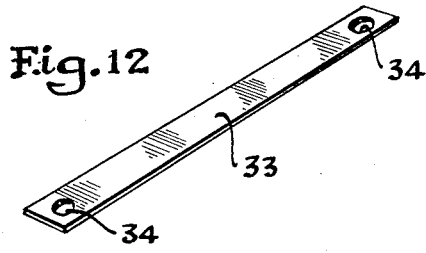
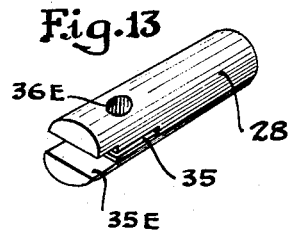
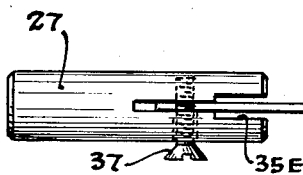
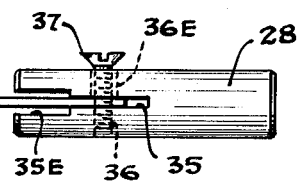
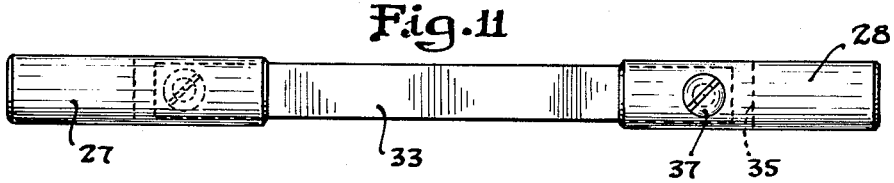
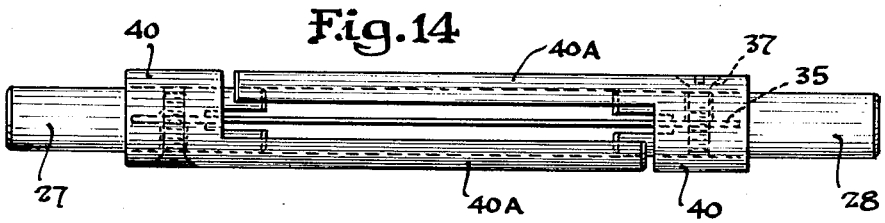
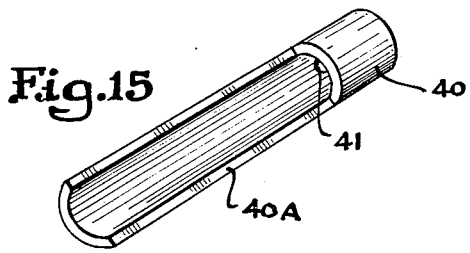

Dec. 29, 1964   J. S. KAWABATA   3,163,037
DYNAMIC TORQUE METER
Filed Oct. 25, 1961   4 Sheets-Sheet 4

Inventor
James S. Kawabata
By Mann, Brown & McWilliams
Attorneys

# United States Patent Office 3,163,037
Patented Dec. 29, 1964

3,163,037
DYNAMIC TORQUE METER
James S. Kawabata, 4317 N. Hermitage, Chicago, Ill.
Filed Oct. 25, 1961, Ser. No. 147,499
10 Claims. (Cl. 73—136)

This invention relates to torque meters, and particularly to dynamic meters.

It is known that dynamic torque meters have heretofore been proposed and used, and in each instance the structure has been relatively complicated and expensive, and it is therefore the primary object of the present invention to provide a dynamic torque meter that is simple in character and which is rugged in its structure so that it provides an extended field of usefulness.

Another and more specific object of the present invention is to provide a dynamic torque meter which is so simple and economically constructed that it may be incorporated as a permanent part of the drive in apparatus where a periodic check on the driving torque is desired.

Another object of the present invention is to provide dynamic torque meter wherein the dynamic balance of the torque meter may be readily attained, and to provide such a torque meter that provides for determining the torque in either direction of rotation.

Other and further objects of the present invention that are related to the foregoing are to provide a dynamic torque meter wherein the torque resisting element is simple and inexpensive in character, and which may be readily calibrated to conform to a standard that has been established in the other elements of the torque meter.

Other and further objects of the present invention will be apparent from the following description and claims, and are illustrated in the accompanying drawings, which by way of illustration show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a schematic perspective view illustrating one side of a torque meter embodying the features of the invention;

FIG. 2 is a schematic perspective view illustrating the other side of the torque meter;

FIG. 3 is a schematic view illustrating the torque meter and the manner in which the indication of the torque is obtained;

FIG. 4 is a side elevational view of the torque meter of this invention;

FIG. 5 is a cross sectional view taken along the lines 5—5 of FIG. 4;

FIG. 6 is a left hand end elevational view of the torque meter shown in FIG. 4;

FIG. 7 is a longitudinal cross sectional view of the device taken substantially along the line 7—7 of FIG. 6;

FIG. 8 is a view similar to FIG. 5 and showing the relationship of the parts when the torque element has been twisted in one direction;

FIG. 9 is a view similar to FIG. 8 but showing the relationship of the parts when the torque element has been twisted in the opposite direction;

FIG. 10 is a plan view of the sub-assembly of the torque meter;

FIG. 11 is a front elevational view of the structure shown in FIG. 10;

FIG. 12 is a perspective view of the torque bar;

FIG. 13 is a perspective view of one of the end shafts of the torque meter;

FIG. 14 is a view similar to FIG. 10 and showing the structure after certain other elements have been added to the assembly;

FIG. 15 is a perspective view illustrating one of the guide sleeves and associated stop elements;

Figure 16:
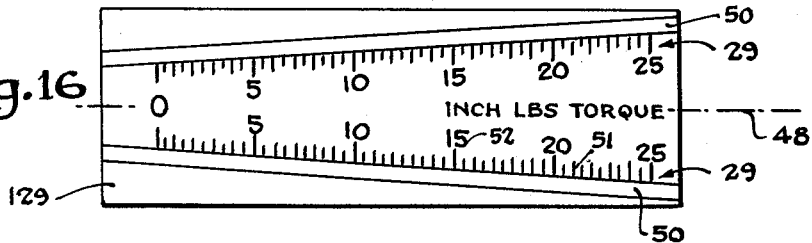
FIGS. 16 and 17 are developed views illustrating the two scale plates of the torque meter.
Figure 17:
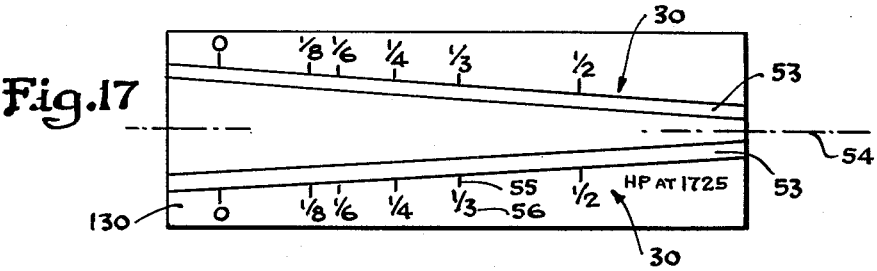
Figure 18:
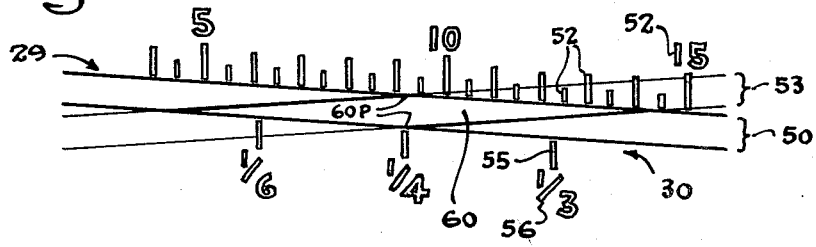
FIG. 18 is a view that fragmentally shows the image that is produced by the present torque meter to indicate the value of the measured torque.
Figure 19:
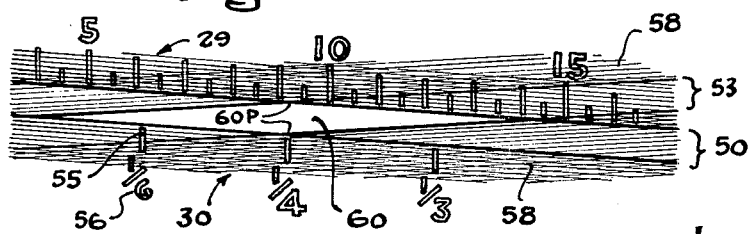
FIG. 19 is a view similar to FIG. 18 showing the image more nearly as it appears to the viewer.

For purposes of disclosure the invention is disclosed in FIGS. 1 to 19 as embodied in a dynamic torque meter 25 that is used in association with a stroboscopic light 26 to provide an accurate and easily readable visual indication, as schematically illustrated in FIGS. 3, 18 and 19, of the torque between constantly rotating driving and driven elements such as shafts between which the torque meter 25 is connected in its use. The torque meter 25, in its external appearance, is generally cylindrical in form, as will be evident in FIGS. 1 to 3 of the drawings, and at its opposite ends has projecting coaxial stub shafts 27 and 28 that constitute power input and power output shafts, respectively, adapted to be connected as by flexible couplers between aligned driving and driven shafts.

While the specific structural characteristics of the torque meter 25 will be described in detail hereinafter, it is pointed out that within the body of the torque meter 25, the input and output shafts 27 and 28 are connected by torsion means. Hence a rotative load impressed on the device in the use thereof results in an angular displacement of the shafts 27 and 28 which varies with or is proportional to such load, and indicating scales 29 and 30, calibrated in units of torque, cooperate with each other under the stroboscopic light 26, to provide a visual indication or reading of the torque as schematically illustrated in FIG. 3 of the drawings.

To clarify the way in which the visual indication of torque is attained, FIGS. 1 and 2 may be considered as also being schematic views. When so considered, FIG. 1 shows the scale 29 as it would appear under a stroboscopic light having a frequency equal to the rate of rotation of the torque meter 25, and adjusted of course so that the stroboscopic light 26 flashes when the scale 29 is in the rotative position shown in FIG. 1. Considered as a schematic view, FIG. 2 is in most respects like FIG. 1, but it shows the torque meter 25 in a different rotative position substantially 180° displaced from the rotative position shown in FIG. 1, and thus the scale 30 is shown in this view.

On the basis of the foregoing description, FIG. 3 is a schematic view showing a composite of the two positions of the scales 29 and 30, and this composite showing results from adjustment of the stroboscopic light 26 so that it flashes at a frequency that is exactly twice the rotative speed of the torque meter 25. It is the composite viewing of the two scales 29 and 30 as shown in FIG. 3 that provides the visual indication of the torque encountered in the use of the torque meter 25, and the images of the individual scales 29 and 30 in FIGS. 1 and 2, respectively, represent merely the fundamental or individual elements that go into the provision of the composite indication that is illustrated in FIG. 3.

The torque meter 25 is built-up from a number of individual elements, some of which have been heretofore mentioned, to produce the structure shown particularly in FIGS. 1 to 19, while in FIGS. 12 to 15, most of the internal elements that make up the device are shown individually and in various stages of assembly. It has been pointed out hereinbefore that the shafts 27 and 28 are connected by torsion means, and under and in accordance with the present invention, such torsion means take the form of a flat elongated torsion bar 33, FIG. 12. The torsion bar 33 is preferably made from an alloy steel, and near its ends has openings 34 formed therein for use in connecting the torsion bar 33 between the input and output shafts 27 and 28. The shafts 27 and 28 are of identical construction and are in the form of relatively short lengths of shafting and each such shaft has a diametric slot 35 cut into what amounts to the inner end of the shaft. The slot 35 has a width that is just slightly greater than the thickness of the torsion bar 33 so that an end of the torsion bar may be inserted into the slot 35 in the relationship shown in FIG. 10 of the drawings. The bar 33 is inserted to a position where the opening 34 is aligned with a threaded bore 36 formed in the shaft at one side of the slot 35, there being an enlarged unthreaded or clearance bore 36E formed in the shaft on the other side of the slot 35. A clamping screw 37 is then inserted into the enlarged bore 36E through the opening 34 of the torsion bar, and is screwed tightly into the threaded bore 36 to clamp opposite sides of the slot 35 against the faces of the torsion bar 33. The area of the torsion bar that is clamped about the faces of the slot 35 is limited by enlarging the slot 35 as at 35E near the inner end of the shaft. As pointed out hereinabove, the shafts 27 and 28 are identical, and are associated with the opposite ends of the torsion bar 33 in the same manner so that the length of the torsion bar 33 located between the bottoms of the slots 35E constitutes the effective length of the bar 33 in its torsion action.

The clamping screws 27 in the present instance are used not only to provide the clamping action above described, but also to associate other elements with the respective shafts 27 and 28. Thus a pair of guide sleeves 40 are provided, these guide sleeves having integral, partial-section arms 40A extended longitudinally therefrom as will be evident in FIGS. 14 and 15. The guide sleeves 40 are made from tubing which has an internal diameter corresponding substantially to the outer diameter of the shafts 27 and 28, and in providing the pair of sleeves 40 with their associated arms 40A, a section of tubing is transversely slotted on opposite sides and the intermediate longitudinal portions of the tubing are milled away to provide the guide sleeves 40 and their associated arms 40A. On that side of the sleeve 40 where the arms 40A are located, an opening 41 is formed and countersunk so that with the sleeves in position as shown in FIG. 14, clamping screws 37 may be extended through the openings 41, the enlarged clearance opening 36E, and the opening 34 in the torsion bar 33, and may then be screwed into the threaded bore 36 to clamp the torsion bar in its slot 35 and at the same time secure the sleeve 40 and its arm 40A in place on the related shaft 27 or 28.

After the guide sleeves 40 and the torque bar 33 have been assembled with respect to the input and output shafts 27 and 28 so as to provide the assembly shown in FIG. 14, a pair of identical mounting bushings 43 are put in position on and about the guide sleeves 40. The mounting bushings 43 have annular flanges 43F at their outer ends, and internally, the bushings 43 have internal bearing sleeves 44 that are cast in place within the bushings 43 and are made from a relatively soft or bendable material such as a porous bronze. The internal diameter of the integral bearing sleeves 44 is such that the bushings 43 may be slipped endwise into place about the guide sleeves 40, and each bushing 43 has a set screw 45 mounting radially therein so as to bear against the outer surfaces of the bearing sleeve 44. This arrangement enables the mounting bushings 43 to be secured in place in accurately determined positions and without damaging the outer surface of the guide sleeves 40. The actual positions of the set screws 45 is shown in FIG. 4, and it should be noted that in FIG. 7 these set screws 45 have been shown in a schematic relation displaced from their actual accessible position of FIG. 4. It will be noted that the bushings 43 extend for substantial distances beyond the inner ends of the guide sleeves 40 so as provide an annular guide space in which the end portions of the arms 40A may move in an annular direction as required in the operation of the device.

The bushings 43 serve as mounting means for a pair of scale plates 129 and 130 that carry the respective scales 29 and 30, and for this purpose the bushings 43 are provided with three radial screw threaded bores to receive mounting screws 47. The scale plates 129 and 130 are identical in physical form and are arcuate in cross section. The length of these scale plates 130 and 129 is such that one end of a plate may abut against the flange 43F of one of the bushings 43, while the other end extends to a point relatively close but spaced from the flange 43F of the other of the two bushings. The plate 129 is secured over a shim 129S on the left hand bushing 43, as shown in FIG. 7, so that it is diametrically opposite the position of the arm 40A of the left hand guide sleeve 40. Similarly, the scale plate 130 is attached over a shim 130S to the right hand bushing 43 so as to be directly or diametrically opposite the location of the arm 40A of the right hand guide sleeve 40. Taking into account the spacing of the arms 40A and the plates 129 and 130 from the axis of rotation of the unit, and taking into account the relative weights of the scale plates 129 and 130 and the arms 40A, dynamic balance of these related parts may be readily established.

The dynamic torque meter 25 of the present invention is of such a character that it provides for measurement of torque in either rotative direction, and this capability is due in part to the fact that the torque bar 33 reacts in an identical manner when it is twisted in either direction, and the capability is further provided through the manner in which the scales 29 and 30 are provided on the respective scale plates 129 and 130. Thus, in FIGS. 16 and 17, which are developed views of the two scale plates 129 and 130, each scale plate has two identical scales formed thereon in an opposite relation. With respect to the scale plate 129, it is noted that upper and lower scales 29 are provided that are symmetrical with respect to a longitudinal center line 48 of the scale plate 129. Each scale 29 comprises a relatively wide indicator line 50 that is disposed at an angle to the center line 48, and these indicator lines slope equally and in opposite directions with respect to the center line 48. Along each indicator line 50, a plurality of spaced scale marks 51 are provided, and graduations 52 are associated at intervals with the scale marks 51. It will be noted that the indicator lines 50 diverge from left to right as provided on the scale plate 129, and on the other scale plate 130, the arrangement is generally similar, but has a reverse relationship, as will be described.

Thus, as to the scale plate 130, a pair of diverging indicator lines 53 are provided that are symmetrical about a longitudinal center line 54 of the scale plate 130, and these indicator lines 53 diverge from right to left, or in other words, in a direction opposite from the direction of divergence of the indicator lines 50 of the scale plate 129. Along the indicator lines 53, a plurality of scale lines 55 are provided and graduations 56 are associated therewith.

It will be noted that the scale plate 129 has its scales 29 calibrated and graduated in inch-pounds of torque, while the scale 130 has its scales 30 calibrated and graduated in horsepower at 1725 r.p.m. This enables either torque or horsepower readings to be obtained, and it will be evident of course that these scales may be graduated in other units and in other ranges of torque as may be required.

The indicator lines 50 and 53, the scale lines 51 and 55 and the graduations or figures 52 and 56 may be provided on the scale plates 129 and 130 by printing, engraving or any other suitable process, but in every event it is desirable that the indicator lines, the scale lines and the figures appear in sharp visual contrast to the surrounding background. Thus the indicator lines, scale lines and numerals are preferably made of a glossy or highly reflective white, while a dark and even dead black color is used in the background as indicated at 58 in FIG. 19, and with such contrast, a sharp image is provided for indicating the torque reading.

Thus, in the composite image shown in FIG. 19, the viewer's eyes receive a single reflection from each of the indicator lines 50 and 53, but in the diamond shaped area 60 where the images of these indicator lines cross each other, the reflection is received twice, so that the area 60 is easily distinguished. Moreover, the area 60 provides corners or points 60P which are located at the exact points on the scales 29 and 30 where the torque reading is to be taken. To insure sharpness of these corners 60P, the ends of the scale marks 52 and 55 are spaced slightly from the indicator lines 50 and 53.

The manufacture, assembly and initial adjustment of the present torque meter are particularly advantageous and economical. Thus, duplicate shafts, guide sleeves and bushings are used, and these parts as well as the torsion bar 33 are simple in form. The spring rate of the torsion bar 33 must of course bear a particular relation to the scales 29 and 30, and such spring rate may be readily and easily corrected or adjusted merely by grinding down one or both side edges of the bar 33. The several parts of the device may then be secured together by a series of simple operations, as above described, and finally the hubs 43 may be readily adjusted in a rotative sense to produce accurate torque readings from a zero or no-load condition throughout the range of the torque scales.

When in the use of the device, the torque exceeds the range provided on the torque scales, the stop arms 40A engage in one of the positions shown in FIGS. 8 and 9 so that a positive drive is provided and overloading of the torque bar 33 is avoided.

From the foregoing description it will be apparent that the present invention provides a torque meter that is simple and rugged in structure and which may be manufactured and sold at a reasonable price. Moreover, the torque meter of this invention provides easily readable torque indicating means, and provides for measuring the torque in either direction.

Thus, while I have illustrated and described a preferred embodiment of my invention it is to be understood that changes and variations may be made by those skilled in the art without departing from the spirit and scope of the appending claims.

I claim:

1. A dynamic torque meter for connection as a driving means between aligned rotating driving and driven elements and adapted when viewed under a stroboscope flashing at 180° intervals of the rotative movement of said elements to present a readily readable measurement of the effective torque between such elements, said torque meter comprising aligned input and output shafts adapted for connection respectively to such driving and driven elements, a spring connecting said input and output shafts to resist relative rotation thereof from a normal static relation to an angularly displaced relation that varies as to angularity as the torque load between the input and output shafts increases, stop means on the input and output shafts arranged to engage to provide a positive drive connection between the input and output shafts after a predetermined angular displacement thereof, a pair of members having their outer faces formed as parts of a common cylindrical surface and connected respectively to the input and output shafts so as to extend on opposite sides of said spring means with said faces in concentric relation, indicating lines on the respective faces at an angle to each other and at least one of which is disposed at an angle to the axis of said input and output shafts, and a scale on one of said faces along the indicator line carried by such face whereby under such stroboscopic lighting a composite image of the two angularly related indicating lines and said scale provides a readily readable dynamic torque measurement.

2. A dynamic torque meter according to claim 1 in which the stop and the member carried by each of the respective shafts are displaced 180° from each other and the stop and the member on the input shaft are disposed 180° from the stop and the member on the output shaft to impart inherent balance to the structure.

3. A dynamic torque meter according to claim 1 in which the stop and the member carried by each of the respective shafts are displaced 180° from each other and the stop and the member on the input shaft are displaced 180° from the stop and the member on the output shaft, and wherein the stop and the member on each shaft are dynamically balanced with respect to each other.

4. A dynamic torque meter for connection as a driving means between aligned rotating driving and driven elements and adapted when viewed under a stroboscope flashing at 180° intervals of the rotative movement of said elements to present a readily readable measurement of the effective torque between such elements, said torque meter comprising aligned input and output shafts adapted for connection respectively to such driving and driven elements, a spring connecting said input and output shafts to resist relative rotation thereof from a normal static relation to an angularly displaced relation that varies as to angularity as the torque load between the input and output shafts increases, stop means on the input and output shafts arranged to engage to provide a positive drive connection between the input and output shafts after a predetermined angular displacement thereof, a pair of members having their outer faces formed as parts of a cylindrical surface and connected respectively to the input and output shafts so as to extend on opposite sides of said spring means with said faces in concentric relation, relatively wide indicating lines on the respective faces and disposed to slope in opposite directions at equal angles to the axis of said input and output shafts, and scale markings on one of said faces along the indicating line carried by such faces, said scale markings and said indicating lines having highly contrasting light reflecting characteristics as compared to adjacent areas of said faces, whereby under such stroboscopic lighting a composite image of the two angularly related indicating lines and said scale provides a readily readable dynamic torque measurement.

5. A dynamic torque meter according to claim 4 in which the spring means is in the form of a flat elongated bar connected between the shafts.

6. In a dynamic torque meter, a torsion responsive unit comprising a pair of aligned shafts and torsion spring means connecting said shafts, a pair of scale plates of identical arcuate cross section disposed on opposite sides of the axis of the unit and centered on such axis, means securing one end of one scale plate to one shaft and means securing the other end of the other scale plate to the other shaft, and scale means on the respective scale plates for cooperation under a stroboscopic light flashing at 180° intervals of the rotative movement of said shafts to form a composite image constituting a measurement of the effective torque between said shafts, said scale means comprising indicating lines on the respective plates disposed to slope in opposite directions and at equal angles relative to said axis, and scale markings on one of the plates along the related indicating line.

7. In a dynamic torque meter, a torsion responsive unit comprising a pair of aligned shafts and torsion spring means connecting said shafts, a pair of scale plates of identical arcuate cross section disposed on opposite sides of the axis of the unit and centered on such axis, means securing one end of one scale plate to one shaft and means securing the other end of the other scale plate to the other shaft, and cooperating scale means on the respective scale plates for cooperation under a stroboscopic light flashing at 180° intervals of the rotative movement of said shafts to form a composite image constituting a measurement of the effective torque between said shafts, said scale means comprising indicating areas on the respective plates of high light reflectivity and defining sloping edges on the respective areas disposed to slope in opposite directions and at equal angles relative to said axis, and scale markings on one of the plates along the related sloping edge.

8. In a dynamic torque meter, a torsion responsive unit comprising a pair of aligned shafts and torsion spring means connecting said shafts, a pair of scale plates of identical arcuate cross section disposed on opposite sides of the axis of the unit and centered on such axis, means securing one end of one scale plate to one shaft and means securing the other end of the other scale plate to the other shaft, and scale means on the respective scale plates for cooperation under a stroboscopic light flashing at 180° intervals of the rotative movement of said shafts to form a composite image constituting a measurement of the effective torque between said shafts, said scale means comprising indicating areas on the respective plates of high light reflectivity and defining sloping edges on the respective areas disposed to slope in opposite directions and at equal angles relative to said axis, and scale markings on one of the plates along the related sloping edge and graduated in horsepower at a predetermined rotative speed.

9. In an apparatus for measuring dynamic torque, a driving shaft and a driven shaft disposed in an aligned relation and drivingly connected by a resilient torque member, a pair of elongated scale plates of identical arcuate cross section disposed on opposite sides of the torque member in concentric relation to each other and to said shafts so that the outer faces of the respective scale plates lie in a common cylindrical surface and have their side edges circumferentially spaced from each other, means securing opposite ends of the scale plates to the respective shafts so that in response to torque effective between the shafts said scale plates are moved edgewise toward each other in a circumferent direction in proportion to such torque, indicator lines of high light reflectivity formed on the respective scale plates so that the indicator lines slope in opposite directions with respect to the side edges of the scale plates, a highly reflective torque measuring scale formed on one of said plates along the indicator line of such plate, and a stroboscopic light adapted to flash at 180° intervals in the rotation of the shafts to produce a composite visual image of the two indicator lines intersecting in a diamond shaped area of greater apparent light intensity with one corner of said diamond shaped area disposed as a pointer closely adjacent the scale and clearly indicating thereon the value of the effective torque.

10. An apparatus according to claim 9 wherein the torque member is in the form of an elongated flat bar that may be readily trimmed on its side edges to coordinate the torque member with a particular pair of scale plates.

References Cited by the Examiner
UNITED STATES PATENTS

| | | | |
|---|---|---|---|
| 1,613,262 | 1/27 | Aoki | 73—136 |
| 2,629,256 | 2/53 | Rank | 73—136 |
| 2,811,853 | 11/57 | Friedman | 73—136 |
| 2,873,584 | 2/59 | Claudy | 73—136 |
| 2,909,764 | 10/59 | Chambers | 73—99 |
| 3,039,301 | 6/62 | Leto et al. | 73—136 |

RICHARD C. QUEISSER, *Primary Examiner.*

DAVID SCHONBERG, *Examiner.*